United States Patent
Zhang et al.

(10) Patent No.: US 10,120,270 B1
(45) Date of Patent: Nov. 6, 2018

(54) TELESCOPIC PROJECTOR

(71) Applicant: GEMMY INDUSTRIES CORPORATION, Coppell, TX (US)

(72) Inventors: Cheng-Chun Zhang, Shenzhen (CN); Lio Yenwei Chang, Coppell, TX (US)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 0 days.

(21) Appl. No.: 15/898,980

(22) Filed: Feb. 19, 2018

(51) Int. Cl.
| | |
|---|---|
| G03B 21/14 | (2006.01) |
| G02B 27/09 | (2006.01) |
| G03B 21/43 | (2006.01) |
| G02B 13/22 | (2006.01) |

(52) U.S. Cl.
CPC ........... *G03B 21/145* (2013.01); *G02B 13/22* (2013.01); *G02B 27/0955* (2013.01); *G03B 21/43* (2013.01)

(58) Field of Classification Search
CPC ...... G03B 21/145; G03B 21/43; G02B 13/22; G02B 27/0955
See application file for complete search history.

(56) References Cited

U.S. PATENT DOCUMENTS

| | | | | |
|---|---|---|---|---|
| 9,194,551 | B1* | 11/2015 | Zhang | F21S 10/007 |
| 9,890,938 | B2* | 2/2018 | Zhang | F21V 21/06 |
| 2002/0101571 | A1* | 8/2002 | Panasewicz | F21V 21/0824 353/119 |
| 2002/0135742 | A1* | 9/2002 | Chiang | G03B 21/20 353/109 |
| 2004/0119951 | A1* | 6/2004 | Vitantonio | F16M 11/10 353/119 |
| 2006/0181684 | A1* | 8/2006 | Hermanson | G03B 21/28 353/31 |
| 2015/0131288 | A1* | 5/2015 | Zhang | F21V 14/06 362/277 |
| 2015/0159842 | A1* | 6/2015 | Zhang | F21V 21/30 362/231 |
| 2016/0026073 | A1* | 1/2016 | Zhang | G03B 21/142 353/101 |

* cited by examiner

*Primary Examiner* — Sultan Chowdhury
*Assistant Examiner* — Magda Cruz
(74) *Attorney, Agent, or Firm* — Osha Liang LLP

(57) ABSTRACT

A telescopic projector has a body, a projecting set, and a focusing set. The body has a shell and a roll film. The roll film is mounted in the shell. The projecting set is mounted in the body and has a power supply board and a radiating unit. The power supply board is located in the shell. The radiating unit is located in the shell and is electrically connected with the power supply board. The focusing set has a focusing electric machine, a driving block, and a sliding unit. The focusing electric machine is mounted in the shell and is electrically connected to the power supply board. The driving block is mounted on a top surface of the focusing electric machine and is controlled by the focusing electric machine. The sliding unit is mounted in the shell and is located above the focusing electric machine.

16 Claims, 8 Drawing Sheets

TELESCOPIC PROJECTOR

BACKGROUND OF THE INVENTION

1. Field of the Invention

The invention relates to a projector, and more particularly to a telescopic projector which can project patterns that freely vary between clear and blurred images.

2. Description of Related Art

A conventional projector has a body, a radiating unit, a roll film, an adjusting ring, and a lens element. The body has a projecting hole. The radiating unit is located in the body and faces the projecting hole. The roll film is located in the body and is located in front of the radiating unit. The adjusting ring is combined with the body and is mounted around the projecting hole. The lens element is combined with the adjusting ring. When the conventional projector is in use, the conventional projector would project a blurred pattern on a screen. Then, the adjusting ring is rotated, and the lens element would be moved to different focal positions. Therefore, the light emitted from the conventional projector would focus on the screen, and this makes the blurred pattern turn into a vivid pattern.

However, the position of the lens element is fixed after the blurred pattern is turned into the vivid pattern, and the projected pattern remains the same. When the conventional projector is used on festivals or parties, the projection effect of the conventional projector is rigid without variations, making the viewers feel bored in visual perception.

To overcome the shortcomings of the conventional projector, the present invention provides a telescopic projector to mitigate or obviate the aforementioned problems.

SUMMARY OF THE INVENTION

The main objective of the present invention is to provide a telescopic projector that can project both clear and blurred patterns and freely change between the different patterns.

The telescopic projector has a body, a projecting set, and a focusing set. The body has a shell and a roll film. The roll film is mounted in the shell. The projecting set is mounted in the body and has a power supply board and a radiating unit. The power supply board is located in the shell. The radiating unit is located in the shell and is electrically connected with the power supply board. The focusing set has a focusing electric machine, a driving block, and a sliding unit. The focusing electric machine is mounted in the shell and is electrically connected to the power supply board. The driving block is mounted on a top surface of the focusing electric machine and is controlled by the focusing electric machine. The sliding unit is mounted in the shell and is located above the focusing electric machine.

Other objects, advantages, and novel features of the invention will become more apparent from the following detailed description when taken in conjunction with the accompanying drawing.

DETAILED DESCRIPTION OF PREFERRED EMBODIMENT

Figure 1:
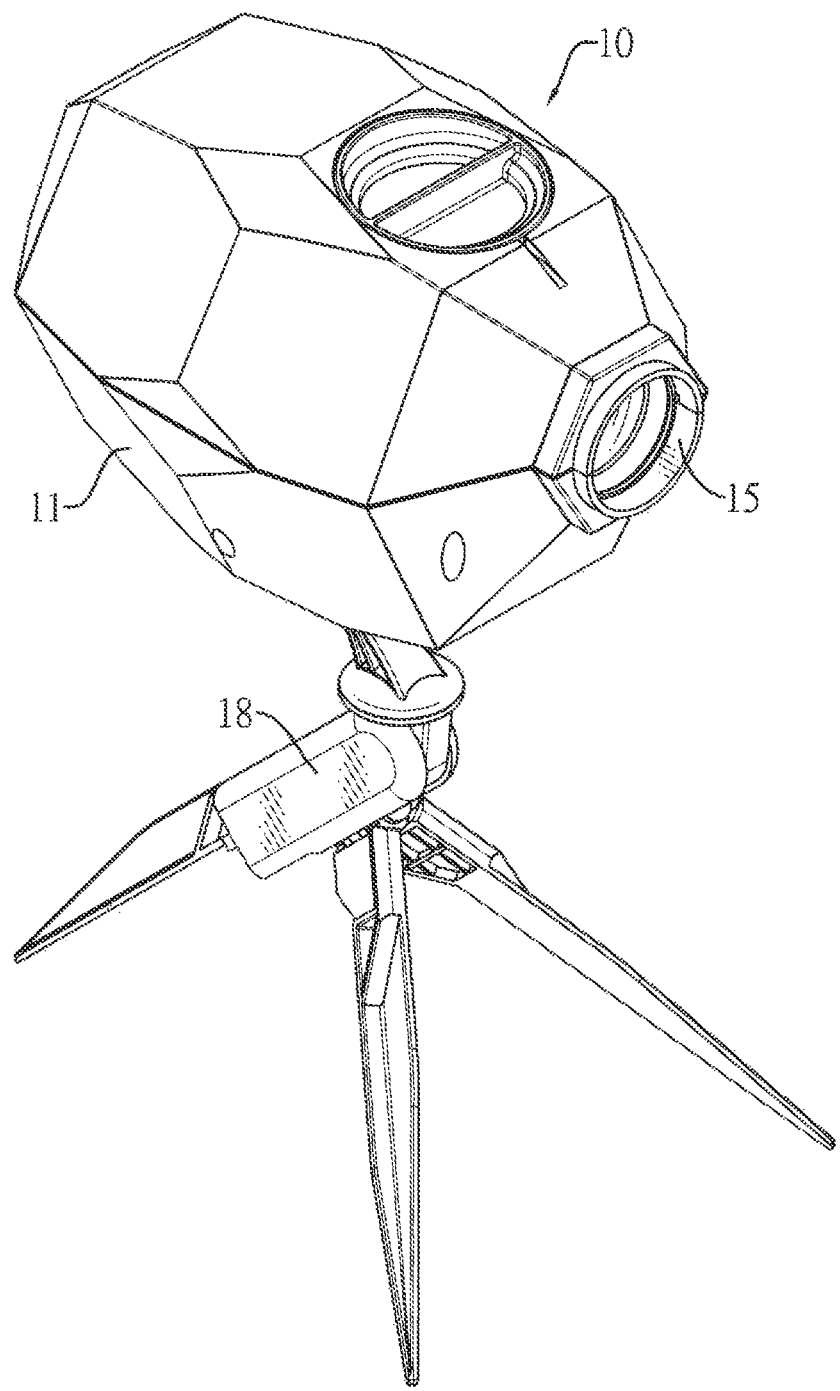
FIG. 1 is a perspective view of a telescopic projector in accordance with the present invention.
Figure 2:
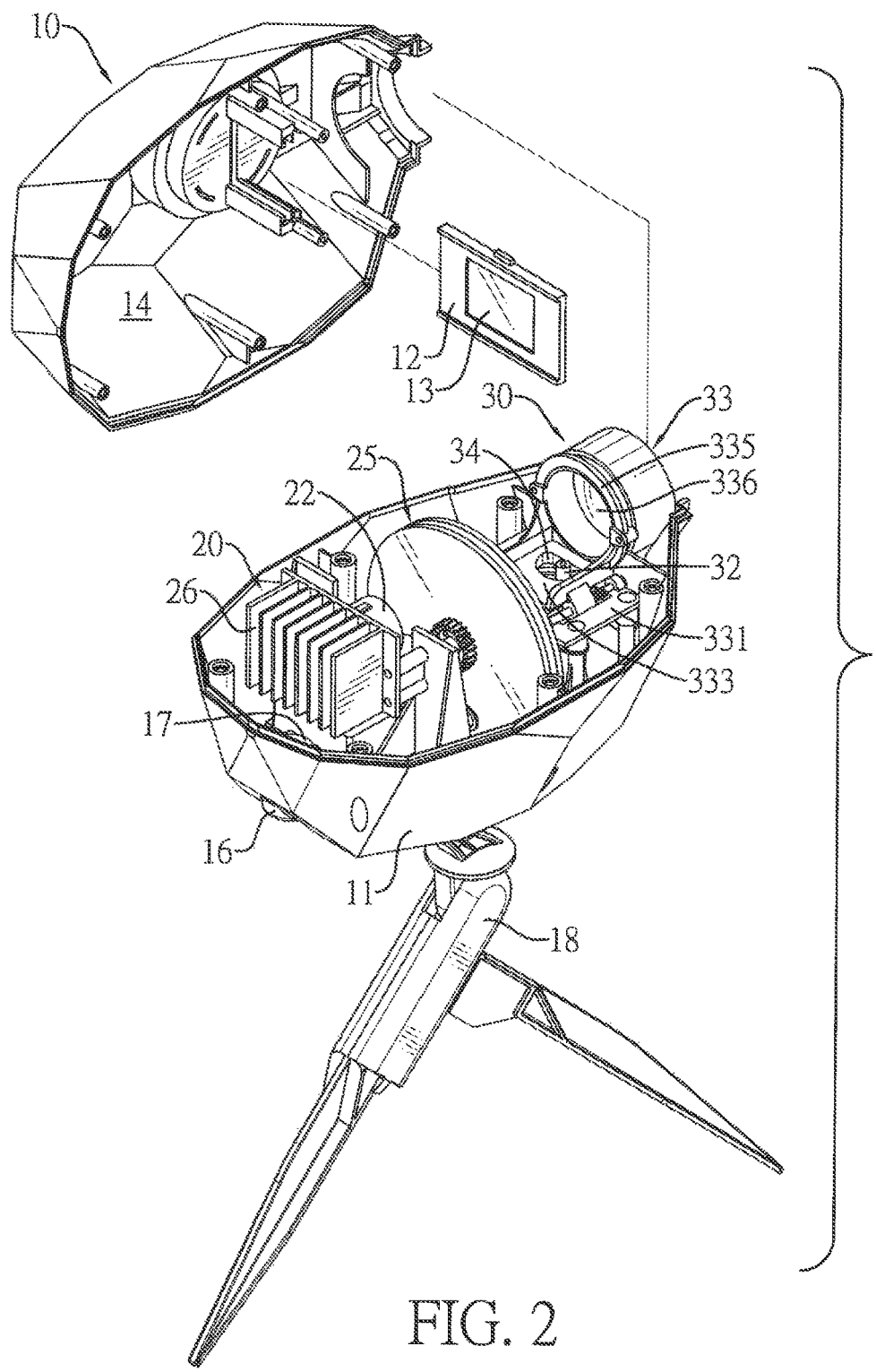
FIG. 2 is an exploded perspective view of the telescopic projector in FIG. 1.
Figure 3:
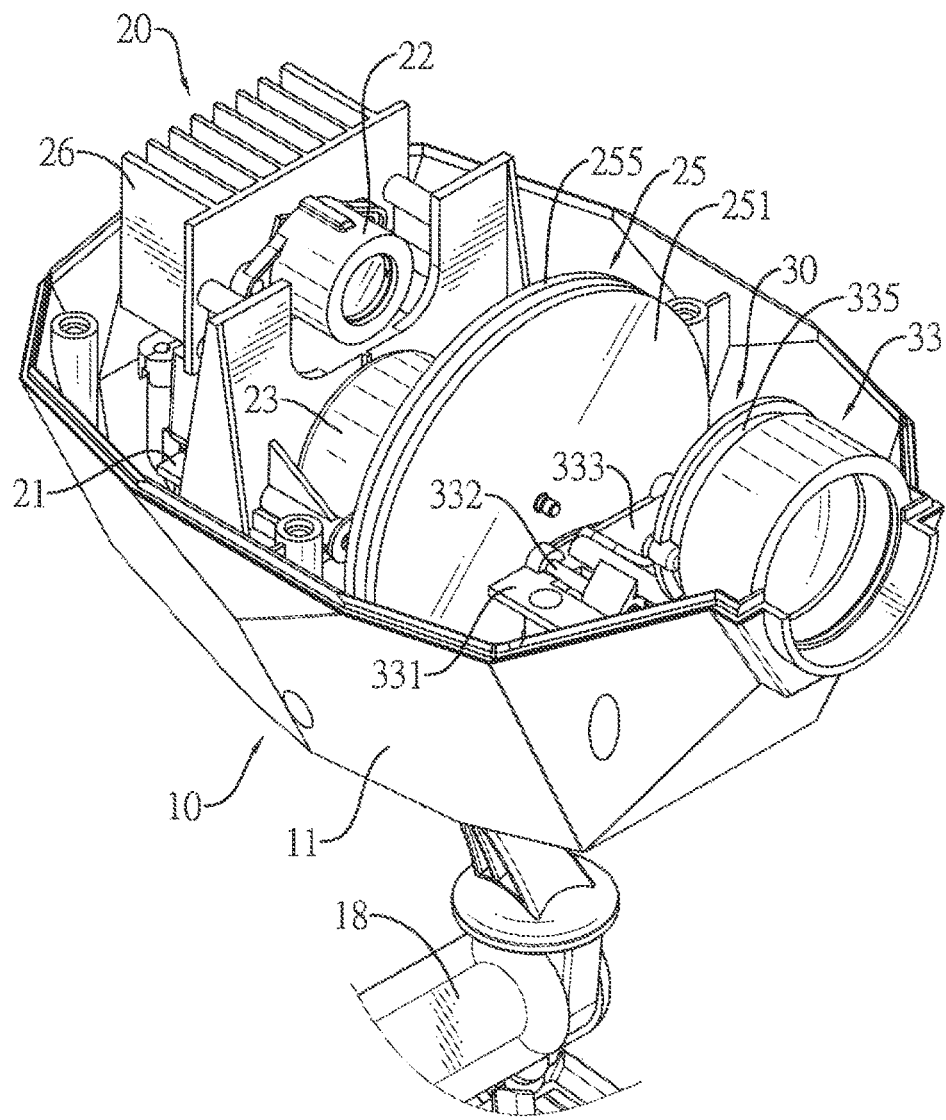
FIG. 3 is an enlarged perspective view of the telescopic projector in FIG. 1 with an upper portion of the shell being removed.

With reference to FIGS. 1 to 3, a telescopic projector in accordance with the present invention comprises a body 10, a projecting set 20, and a focusing set 30.

The body 10 has a shell 11, a positioning board 12, and a roll film 13. An operating space 14 is formed in the shell 11. A projecting hole 15 is formed through a front end of the shell 11. The positioning board 12 is mounted in the shell 11 and is located in the operating space 14. The roll film 13 is changeably combined with the positioning board 12. A wire hole 16 is formed through a bottom surface of the shell 11, and the wire hole 16 is adjacent to a rear end of the shell 11. Preferably, the body 10 has a wire mount 17. The wire mount 17 is mounted in the shell 11 and is adjacent to the wire hole 16. Furthermore, the body 10 has a supporting element 18. The supporting element 18 is mounted on the bottom surface of the shell 11.

Figure 4:
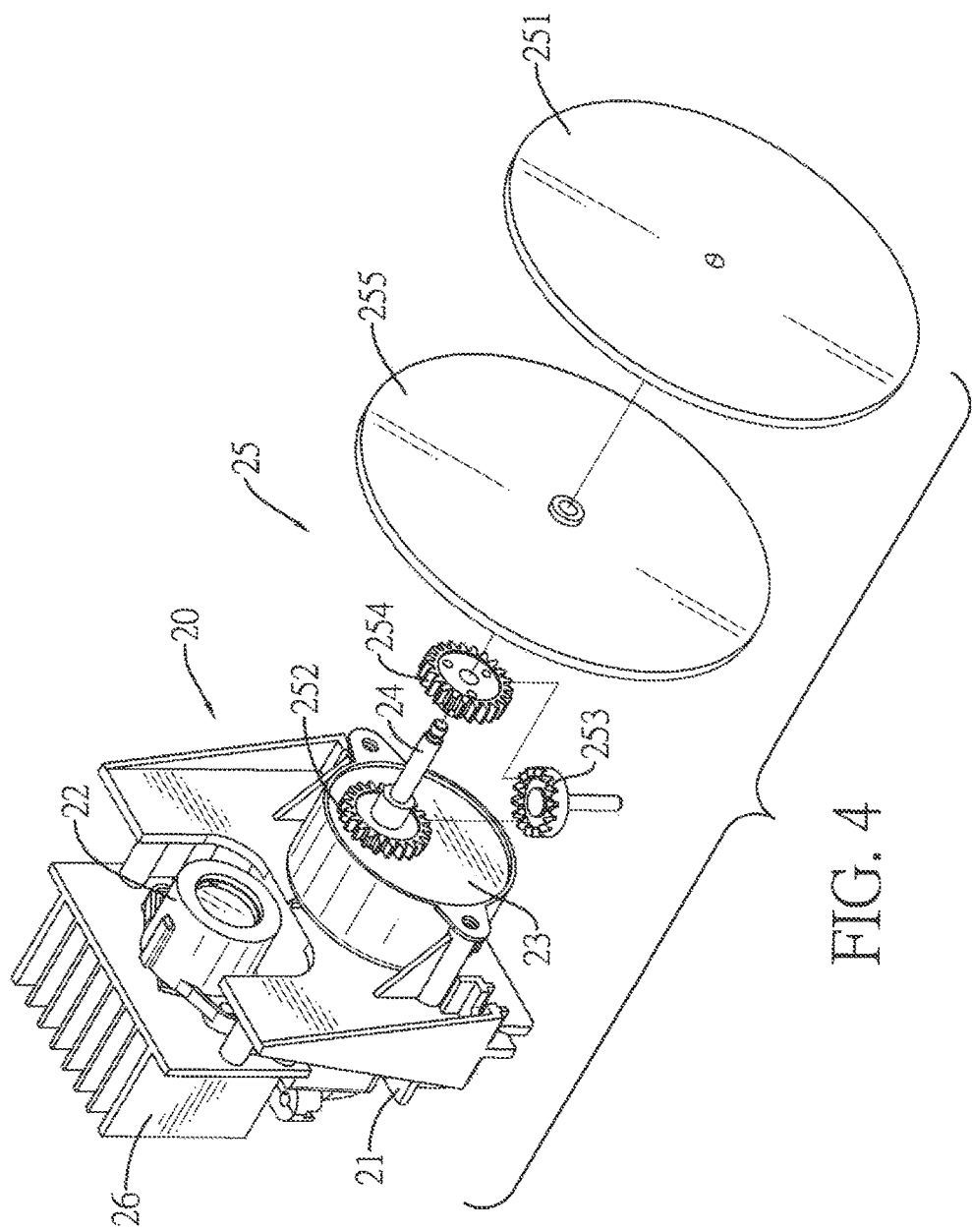
FIG. 4 is an exploded perspective view of the projecting set of the telescopic projector in FIG. 1.

With reference to FIG. 2 to 4, the projecting set 20 is mounted in the shell 11 and is located in the operating space 14. The projecting set 20 is located between an inner surface of the shell and the roll film 13. The projecting set 20 has a power supply board 21 and a radiating unit 22. The power supply board 21 is located in the shell 11. The radiating unit 22 is located in the shell 11 and is electrically connected with the power supply board 21. The projecting set 20 further has a rotating electric machine 23, a shaft 24, a corrugation unit 25, and a heat dissipation element 26. The rotating electric machine 23 is located in the shell 11 and is electrically connected with the power supply board 21. The shaft 24 is connected with and controlled by the rotating electric machine 23. The corrugation unit 25 is combined with the shaft 24 and has an active corrugation sheet 251, an active gear 252, a rotating element 253, a passive gear 254, and a passive corrugation sheet 255. The active corrugation sheet 251 is fixed to the shaft 24. The active gear 252 is fixed to the shaft 24. The rotating element 253 is rotatably mounted in the shell 11 and is engaged with the active gear 252. The passive gear 254 is mounted around the shaft 24 and is engaged with the rotating element 253. The passive corrugation sheet 255 is mounted around the shaft 24 and is fixed to the passive gear 254. The heat dissipation element 26 is mounted in the shell 11 and is adjacent to the radiating unit 22.

Figure 5:
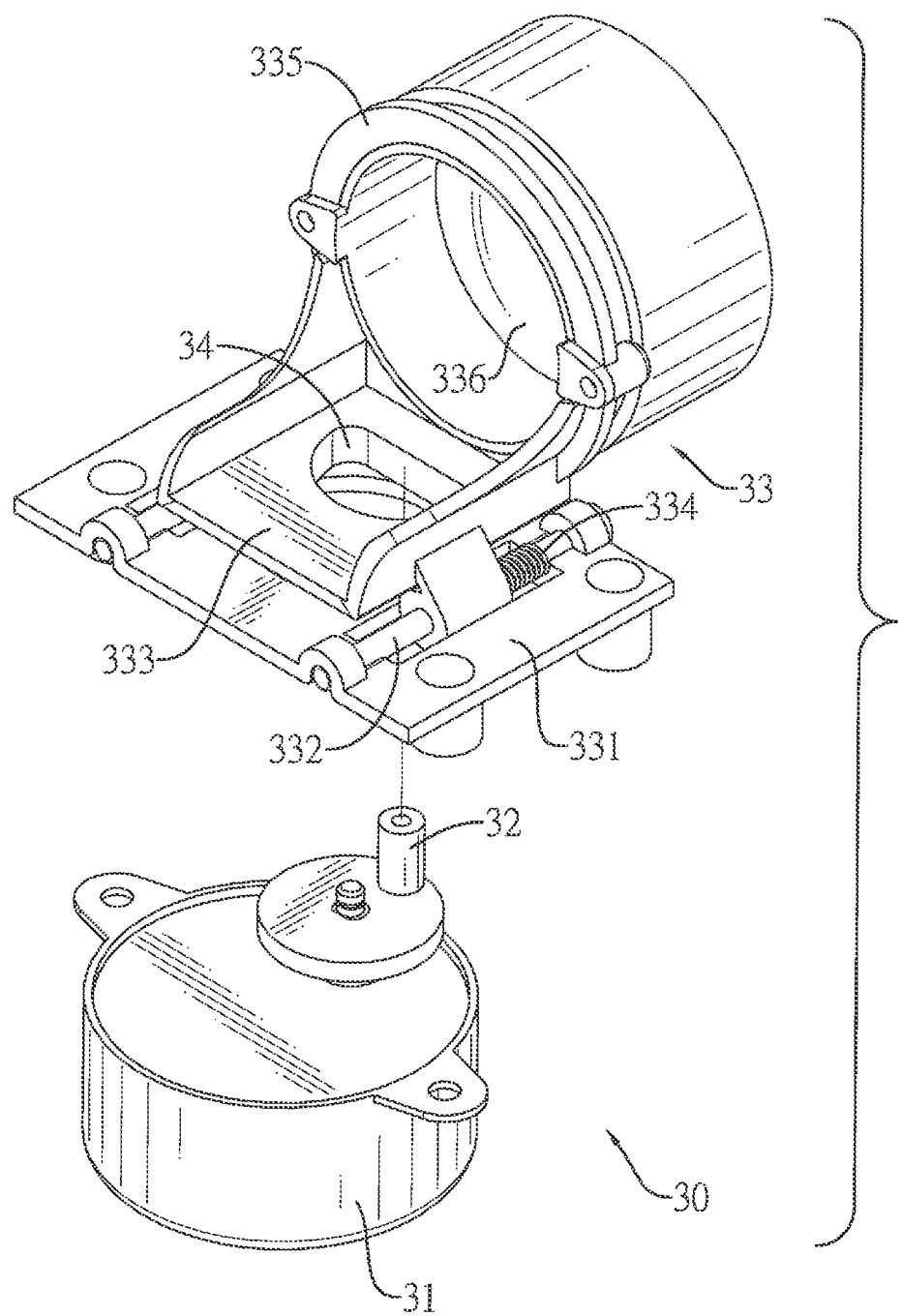
FIG. 5 is an exploded perspective view of the focusing set of the telescopic projector in FIG. 1.

With reference to FIGS. 2, 3, and 5, the focusing set 30 is mounted in the shell 11 and located in the operating space 14. The focusing set 30 is located in front of the projecting set 20 and the roll film 13. The focusing set 30 has a focusing electric machine 31, a driving block 32, and a sliding unit 33. The focusing electric machine 31 is mounted in the shell 11 and is electrically connected to the power supply board 21. The driving block 32 is mounted on a top surface of the focusing electric machine 31 and is controlled by the focusing electric machine 31. The sliding unit 33 is mounted in the shell 11 and is located above the focusing electric machine 31. The sliding unit 33 has a fixed base 331, two fixed rails 332, a sliding board 333, two reset elements 334, a lens collar 335, and a lens element 336. The fixed base 331 is mounted in the shell 11. The two fixed rails 332 are mounted on a top surface of the fixed base 331, and are parallel to each other. The sliding board 333 is slidably mounted across the two fixed rails 332. The sliding board 333 has an opening 34. The opening 34 is formed though the sliding board 333. The driving block 32 is mounted through the opening 34. Each reset element 334 is combined with one of the fixed rails 332 and is located between the sliding board 333 and the fixed base 331. The lens collar 335 is mounted on a top surface of the sliding board 333. The lens element 336 is combined with the lens collar 335.

Figure 6:
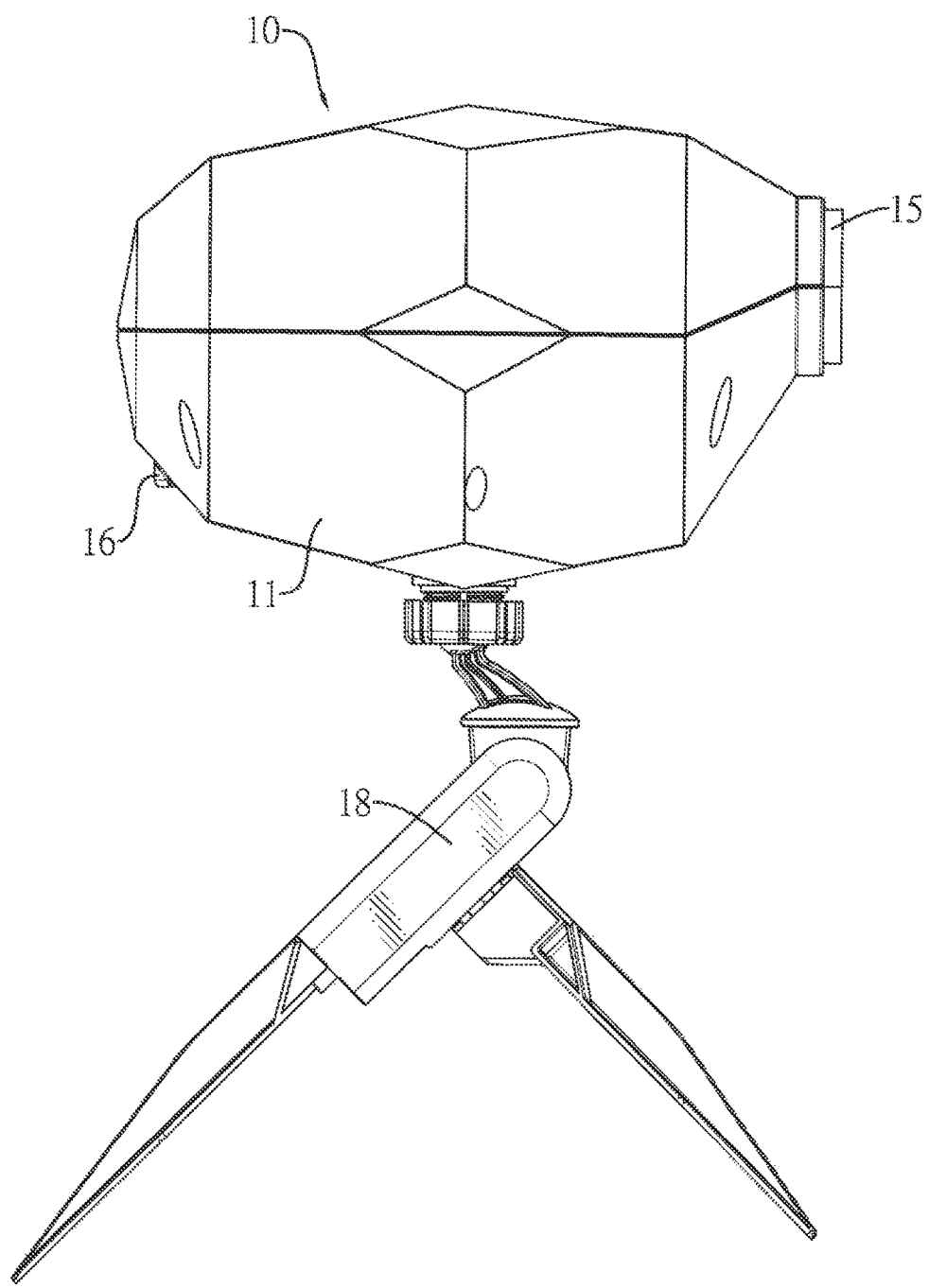
FIG. 6 is a side view of the telescopic projector in FIG. 1.
Figure 7:
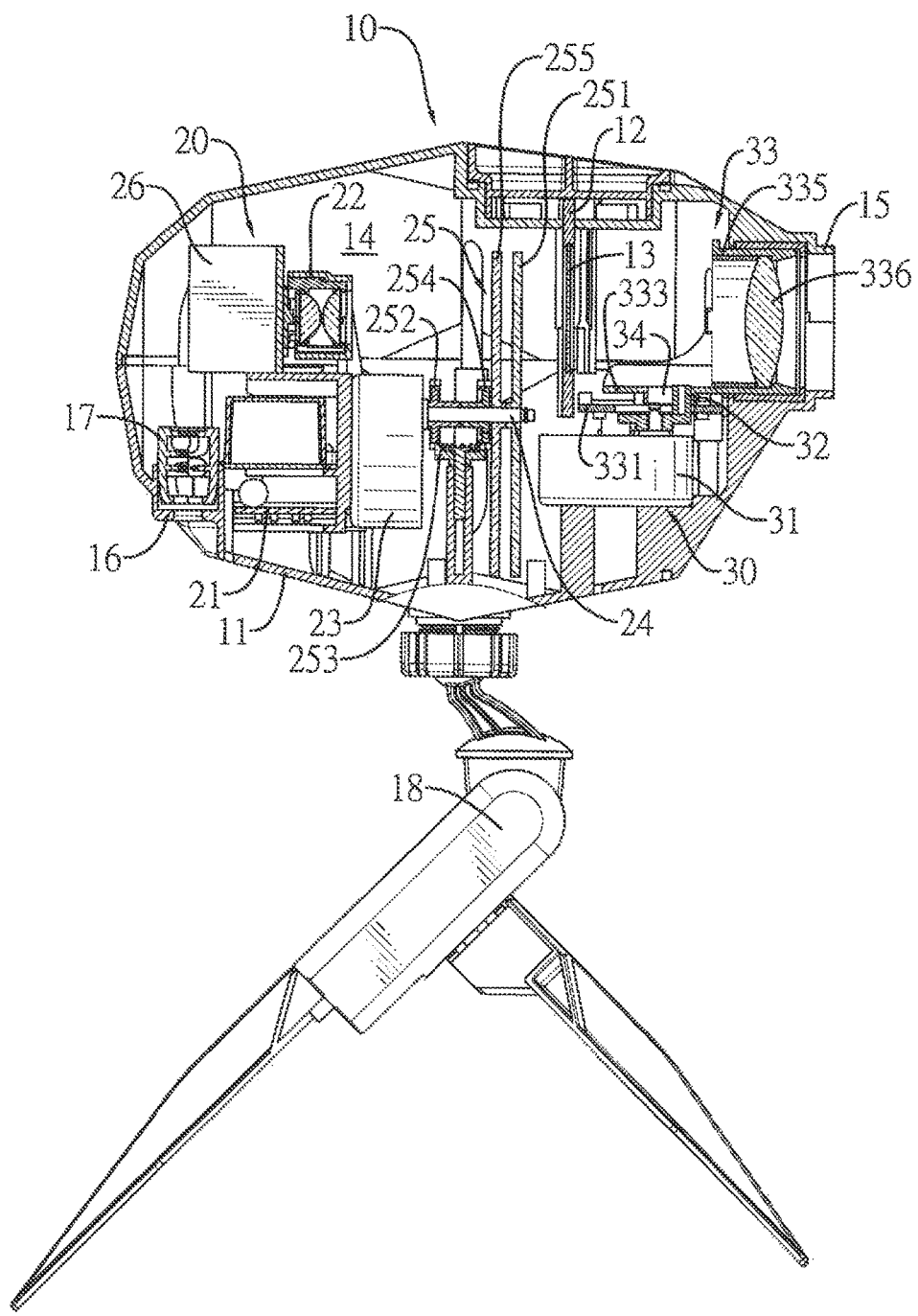
FIG. 7 is a side view in partial section of the telescopic projector in FIG. 1.
Figure 8:
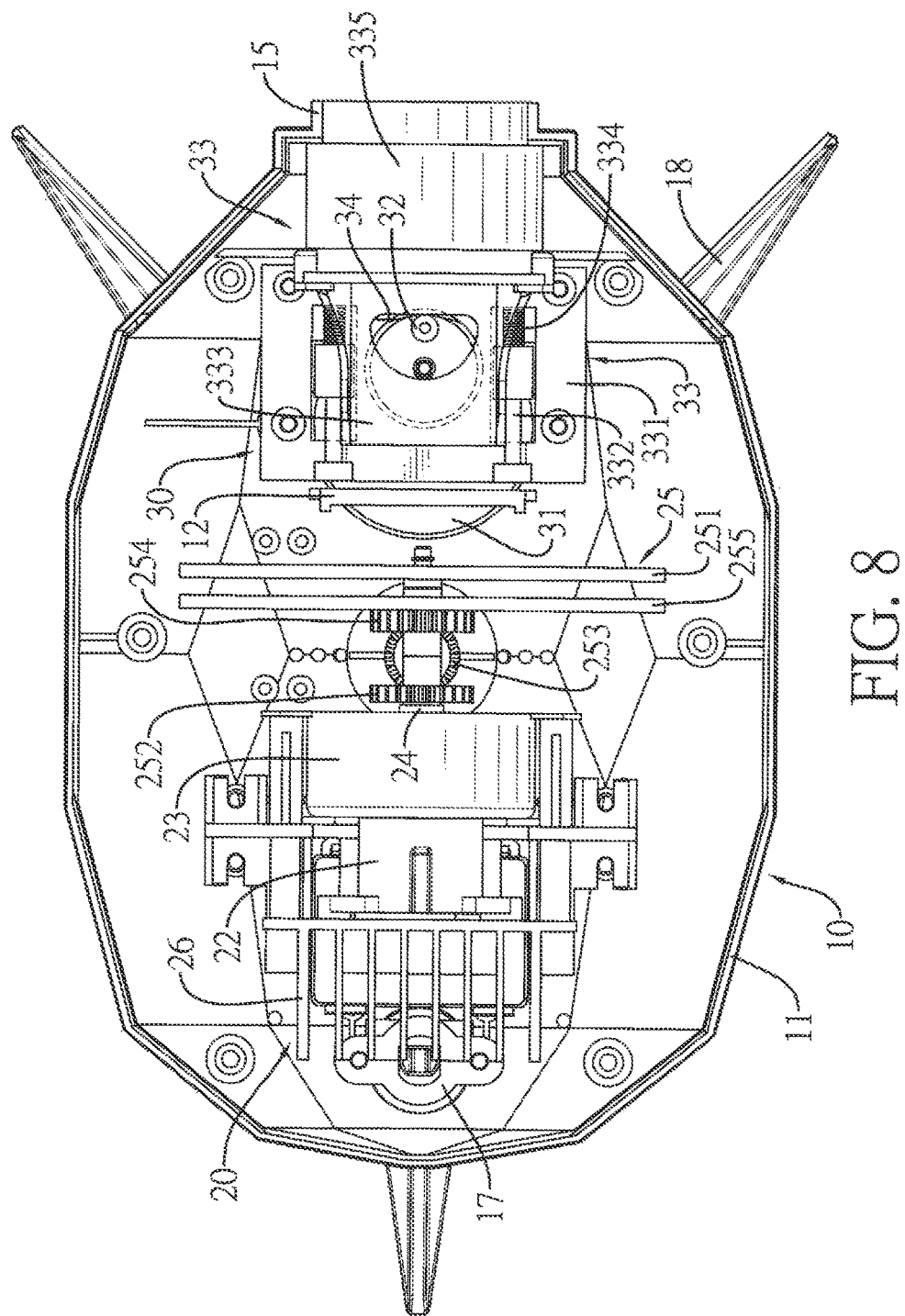
FIG. 8 is a top view of the telescopic projector in FIG. 3.

With reference to FIGS. 6 to 8, when the telescopic projector in accordance with the present invention is in use, a wire is inserted into the body 10 and is connected with the power supply board 21 via the wire hole 16. The wire is fixed to the wire mount 17 and the wire can supply electricity to the power supply board 21. The power supply board 21 may switch Alternate Current (AC) to Direct Current (DC), and the DC would be supplied to the rotating electric machine 23 and the radiating unit 22 of the projecting set 20 and the focusing electric machine 31 of the focusing set 30. After the rotating electric machine 23 is supplied with electricity, the rotating electric machine 23 would drive the shaft 24 to rotate. The active corrugation sheet 251 of the corrugation unit 25 would also be driven to rotate. Multiple corrugated stripes on the active corrugation sheet 251 would rotate in the direction driven by the rotating electric machine 23. The active gear 252 drives the rotating element 253 to rotate, and the rotating element 253 drives the passive gear 254 to rotate. The rotating direction of the passive gear 254 is opposite to the rotating direction of the active gear 252. The passive corrugation sheet 255 would rotate with the passive gear 254. The rotating direction of the passive corrugation sheet 255 is opposite to the rotating direction of the active corrugation sheet 251. The radiating unit 22 would emit light after the radiating unit 22 is supplied with electricity, and the light would pass through the active corrugation sheet 251, the passive corrugation sheet 255, and the roll film 13.

After the focusing electric machine 31 is supplied with electricity, the focusing electric machine 31 would drive the driving block 32 to rotate. The driving block 32 and the reset elements 334 interact to slide the sliding board 333 back and forth. The sliding board 333 drives the lens collar 335 to move back and forth. The lens element 336 will be sometimes close to the positioning board 12 and sometimes away from the positioning board 12. Light emitted from the roll film 13 will pass through the lens element 336 and project patterns, clear and blurred alternately, through the projecting hole 15. Because the rotating direction of the passive corrugation sheet 255 is opposite to the rotating direction of the active corrugation sheet 251, the projected pattern has dynamic variations. The telescopic projector in accordance with the present invention can activate the festive atmosphere of holiday parties or gathering occasions so that the viewers can feel the cheerful and lively atmosphere.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A telescopic projector comprising:
   a body having
      a shell having
         an operating space formed in the shell; and
         a projecting hole formed through a front end of the shell;
      a positioning board mounted in the shell and located in the operating space; and
      a roll film changeably combined with the positioning board;
   a projecting set mounted in the shell, located in the operating space, located between an inner surface of the shell and the roll film, and having
      a power supply board located in the shell; and
      a radiating unit located in the shell and electrically connected with the power supply board;
   a focusing set mounted in the operating space, located in front of the projecting set and the roll film, and having
      a focusing electric machine mounted in the shell and electrically connected to the power supply board;
      a driving block mounted on the focusing electric machine and rotated with the focusing electric machine; and
      a sliding unit mounted in the shell, located above the focusing electric machine, and having
         a fixed base mounted in the shell;
         two fixed rails on a top surface of the fixed base, and being parallel to each other,
         a sliding board slidably mounted across the two fixed rails and having
            an opening formed though the sliding board, wherein the driving block is mounted through the opening;
         two reset elements, each reset element combined with one of the fixed rails and located between the sliding board and the fixed board;
         a lens collar mounted on the sliding board; and
         a lens element combined with the lens collar.

2. The telescopic projector as claimed in claim 1, wherein the projecting set has
   a rotating electric machine located in the shell and electrically connected with the power supply board;
   a shaft connected with the rotating electric machine and controlled by the rotating electric machine; and
   a corrugation unit combined with the shaft and having
      an active corrugation sheet fixed to the shaft;
      an active gear fixed to the shaft;
      a rotating element rotatably mounted in the shell and engaged with the active gear,
      a passive gear mounted around the shaft and engaged with the rotating element; and
      a passive corrugation sheet mounted around the shaft and fixed to the passive gear.

3. The telescopic projector as claimed in claim 2, wherein a wire hole is formed through a bottom surface of the shell, the wire hole is adjacent to a rear end of the shell, and the shell has a wire mount mounted in the shell and being adjacent to the wire hole.

4. The telescopic projector as claimed in claim 3, wherein the body has a supporting element mounted on a bottom surface of the shell.

5. The telescopic projector as claimed in claim 4, wherein the projecting set has a heat dissipation element mounted in the shell and being adjacent to the radiating unit.

6. The telescopic projector as claimed in claim 3, wherein the projecting set has a heat dissipation element mounted in the shell and being adjacent to the radiating unit.

7. The telescopic projector as claimed in claim 2, wherein the body has a supporting element mounted on a bottom surface of the shell.

8. The telescopic projector as claimed in claim 7, wherein the projecting set has a heat dissipation element mounted in the shell and being adjacent to the radiating unit.

9. The telescopic projector as claimed in claim 2, wherein the projecting set has a heat dissipation element mounted in the shell and being adjacent to the radiating unit.

10. The telescopic projector as claimed in claim 1, wherein a wire hole is formed through a bottom surface of the shell, the wire hole is adjacent to a rear end of the shell, and the shell has a wire mount mounted in the shell and being adjacent to the wire hole.

11. The telescopic projector as claimed in claim 10, wherein the body has a supporting element mounted on the bottom surface of the shell.

12. The telescopic projector as claimed in claim 11, wherein the projecting set has a heat dissipation element mounted in the shell and being adjacent to the radiating unit.

13. The telescopic projector as claimed in claim 10, wherein the projecting set has a heat dissipation element mounted in the shell and being adjacent to the radiating unit.

14. The telescopic projector as claimed in claim 1, wherein the body has a supporting element mounted on a bottom surface of the shell.

15. The telescopic projector as claimed in claim 14, wherein the projecting set has a heat dissipation element mounted in the shell and being adjacent to the radiating unit.

16. The telescopic projector as claimed in claim 1, wherein the projecting set has a heat dissipation element mounted in the shell and being adjacent to the radiating unit.

* * * * *